US006938215B2

(12) United States Patent
Kobayashi et al.

(10) Patent No.: US 6,938,215 B2
(45) Date of Patent: Aug. 30, 2005

(54) DISPLAY APPARATUS AND METHODS, AND RECORDING MEDIUM FOR CONTROLLING SAME

(75) Inventors: Mayumi Kobayashi, Tokyo (JP); Tadashi Nakayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 298 days.

(21) Appl. No.: 10/106,779

(22) Filed: Mar. 27, 2002

(65) Prior Publication Data

US 2002/0097275 A1 Jul. 25, 2002

Related U.S. Application Data

(63) Continuation of application No. 09/824,805, filed on Apr. 4, 2001, which is a continuation of application No. 09/592,294, filed on Jun. 12, 2000, now abandoned, which is a continuation of application No. 08/941,760, filed on Sep. 30, 1997, now abandoned.

(30) Foreign Application Priority Data

Oct. 3, 1996  (JP) .............................................. 8-263032
Apr. 1, 1997  (JP) .............................................. 9-082562

(51) Int. Cl.$^7$ ................................................. G06F 3/00
(52) U.S. Cl. ....................... 715/810; 715/716; 715/835; 715/838; 348/333.02; 358/906
(58) Field of Search .............................. 715/500.1, 716, 715/727, 764, 781, 810, 835, 838, 839, 840, 846, 853, 854, 972, 977; 348/231, 232, 333.01, 333.02, 341; 358/906, 909.1; 345/716, 727, 810, 835, 838, 839, 840, 846, 853, 854, 972, 977

(56) References Cited

U.S. PATENT DOCUMENTS 5,060,135 A    10/1991  Levine et al. ............... 715/769
5,404,316 A    4/1995   Klingler et al. ............. 715/723
5,442,795 A    8/1995   Levine et al. ............... 715/775
5,513,306 A    4/1996   Mills et al. ................. 715/530
5,524,193 A    6/1996   Covington et al. .......... 715/512
5,537,528 A    7/1996   Takahashi et al. .......... 715/512
5,541,656 A    7/1996   Kare et al. ............. 348/333.02
5,659,793 A    8/1997   Escobar et al. .......... 715/500.1

(Continued)

FOREIGN PATENT DOCUMENTS

EP          0 403 118        12/1990
EP          0698993 A2 *     2/1996    .......... H04N/1/387

OTHER PUBLICATIONS

"Aldus Looks to Ease Multimedia Users' Search and Retrieval Woes", Dec 1992, Multimedia Week, v1, n19.*
Rich Santalesa, "Ultimedia Workplace/2: OS/2's media-a-browsing light table", Apr. 1994, Computer Shopper, v14, n4, p768(2).*
"GRAPHICS/DTP—ImagePals: Trio Tackles Imaging Tasks", 1992, Windows Magazine, n308, 44.*
Harvey A. Cohen, "Thumbnail–Based Image Coding Utilizing the Fractal Transform", IEEE 1996, pp. 145–148.
C.A. Burton et al., "An Empirical Investigation of Thumbnail Image Recognition", IEEE 1995, pp. 115–121.
Harvey A. Cohen, "Access and Retrieval from Image Database Using Image Thumbnails", IEEE 1996, pp. 427–428.

Primary Examiner—X. L. Bautista
(74) Attorney, Agent, or Firm—Oliff & Berridge, PLC

(57) ABSTRACT

In order to enable a user to obtain information about a large number of recorded images, a display apparatus includes a browser window that can be switched between two modes. In the first mode, a first screen, referred to as an Icon Browser Screen, displays a list of files (that contain image data and/or additional data such as sound data and overlay image data) that are recorded in a recording apparatus such as, e.g., an electronic camera. In the second mode, a second screen, referred to as a Thumbnail Image Browser Screen, displays a series of thumbnail images of the images recorded in the recording apparatus. A thumbnail check box can be selected to switch between the two screens.

29 Claims, 6 Drawing Sheets

U.S. PATENT DOCUMENTS

| | | | |
|---|---|---|---|
| 5,666,159 A | 9/1997 | Parulski et al. | 348/211 |
| 5,682,326 A | 10/1997 | Klingler et al. | 715/500.1 |
| 5,706,097 A * | 1/1998 | Schelling et al. | 358/296 |
| 5,706,457 A | 1/1998 | Dwyer et al. | 715/83.5 |
| 5,760,767 A | 6/1998 | Shore et al. | 715/723 |
| 5,796,945 A | 8/1998 | Tarabella | 709/219 |
| 6,249,316 B1 * | 6/2001 | Anderson | 348/333.05 |
| 6,570,587 B1 * | 5/2003 | Efrat et al. | 345/723 |
| 6,683,649 B1 * | 1/2004 | Anderson | 348/333.05 |

* cited by examiner

DISPLAY APPARATUS AND METHODS, AND RECORDING MEDIUM FOR CONTROLLING SAME

INCORPORATION BY REFERENCE

The disclosures of the following priority applications are herein incorporated by reference: Japanese Patent Application No. 08-263032 filed Oct. 3, 1996 and Japanese Patent Application No. 09-082562 filed Apr. 1, 1997.

BACKGROUND OF THE INVENTION

1. Field of Invention

The present invention relates to display apparatus, display methods and to recording media for controlling the same, in which information relating to a plurality of images can be displayed.

2. Description of Related Art

With the development of semiconductor technology, information recording apparatus such as electronic cameras and electronic diaries that record images and sound as digital data have become available. Some of these apparatus include an interface so that they can be connected to personal computers and the like to output recorded data such as images and sound to, or via, the personal computer.

Such computers, for example, contain a program that reads data such as images and sound when the computer is connected to the recording apparatus. Some of these computers also display a series of reduced images (known as thumbnail images) of the images stored in the recording apparatus.

However, when there is a large amount of image data stored in the recording apparatus, computers face a number of problems. First, the time required to display a series of reduced images increases as the number of images increases because, inter alia, the images must be transmitted through the interface and then displayed. Second, it becomes difficult to display all reduced images on the display screen due to the limited size of the display screen.

SUMMARY OF THE INVENTION

The present invention addresses these and other problems by enabling users to grasp more recorded images by displaying icons corresponding to each image.

According to one aspect of the invention, a display apparatus switches between two display screens that identify the data stored in a recording device that is coupled to the display apparatus. The recording device, which can be, for example, an electronic camera, stores a plurality of recording units, each recording unit including at least one of image data, overlay data and sound data. The first display screen displays a series of images (preferably reduced (thumbnail) images) of the image data stored in one or more of the recording units. The second display screen displays a list of representations of the one or more recording units, the representations being smaller than the images displayed in the first display screen. This enables the second display screen to display information about a larger number of files than is capable with the first display screen.

The representations can be file names or icons representing the recording units.

The first and second display screens also can display additional icons that indicate the presence (or absence) of overlay data and sound data, etc., for each recording unit.

The file name can be displayed along with the image (preferably a reduced image) in the first display screen.

Another aspect of the invention relates to the method of displaying the above information using a display apparatus.

A further aspect of the invention relates to a recording medium that stores a control program to control a display apparatus to function as described above.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
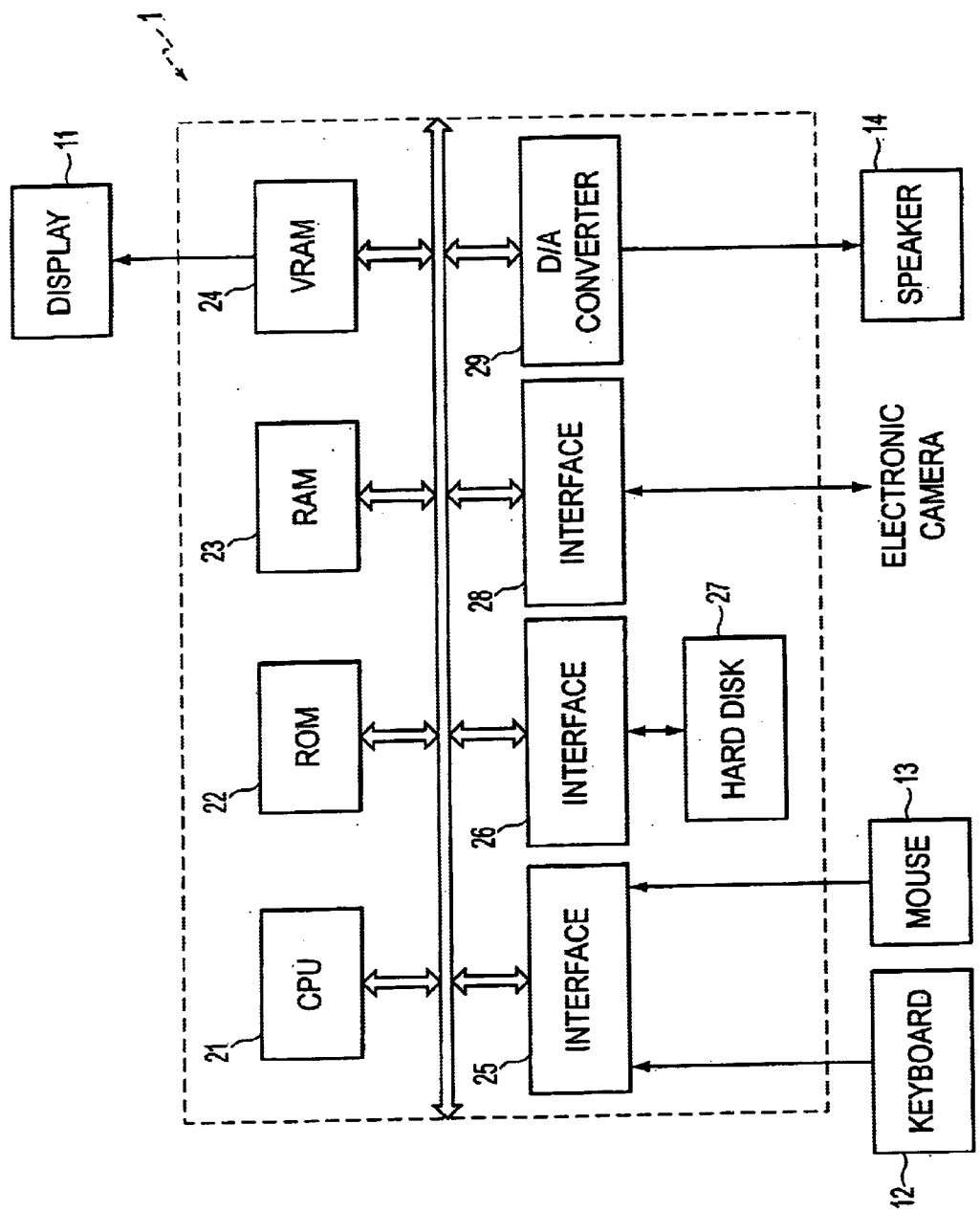
FIG. 1 is a block diagram of a display apparatus according to an embodiment of the present invention.

FIG. 1 is a block diagram that shows the construction of one embodiment of the present invention. In this display apparatus 1, a CPU 21 carries out various operations according to the programs recorded in ROM 22 or in the hard disk 27 (one type of recording medium).

RAM 23 temporarily records programs and the data that is being processed. VRAM 24 has memory areas corresponding to pixels of a display 11 and outputs the values of the memory areas to the display 11.

An interface 25 is connectable to input devices such as, for example, a keyboard 12, a mouse 13, and the like, and supplies signals from these devices to CPU 21. An interface 26 is connected to the hard disk 27 and transfers control signals or data between CPU 21 and the hard disk 27. The hard disk 27 saves various programs and data and, for example, saves a program that caries out actions that will be described hereafter. An interface 28 is connectable to an electronic camera or the like, which contains the same standardized interface, and facilitates communication with the camera or the like. A D/A converter 29 converts voice data supplied from CPU 21 to an analog voice signal and outputs the analog voice signal to the speaker 14.

Next, functions performed by the apparatus in FIG. 1 are explained, for example, when information relating to the images corresponding to the image data saved in an electronic camera connected to display apparatus 1 through the interface 28 is displayed. First, the keyboard 12 and mouse 13 are operated and the program (saved, e.g., in the hard disk 27) that displays the image data saved in the electronic camera is executed. When the program is executed, CPU 21 reads the image data corresponding to the tool window shown in FIG. 2 to VRAM 24 and displays the tool window on the display 11.

The tool window includes a camera button 31, an operation component 32, a cancel button 33 and an environment setting button 34. The camera button 31 is operated when the latter-described browser window is to be displayed. The operation component 32 is operated to perform reverse rotation of images displayed in the browser window and the like and/or to change direction, as will be described below. The environment setting button 34 is operated to make various settings. The cancel button 33 is operated when it is desired to exit the program. When the cancel button 33 is operated, the various settings are recorded, and the program is exited.

The operation component 32 includes a horizontal switching button 32A that is operated when it is desired to move the display image in the horizontal direction. A vertical switching button 32B is operated when it is desired to move the display image in the vertical direction. A counter-clockwise direction 90-degree rotation button 32C is operated when it is desired to rotate the display image in the counter-clockwise direction by 90 degrees. A clockwise direction 90-degree rotation button 32D is operated when it is desired to rotate the display image in the clockwise direction by 90 degrees. The user moves a cursor (not depicted) displayed in the screen of the display 11 using the mouse 13 or the keyboard 12 to select the above-mentioned buttons.

When the camera button 31 of the tool window is selected by operating the mouse 13 or the keyboard 12, CPU 21 displays a browser window, which causes the display of images relating to the image data saved in the electronic camera, as detailed below. The browser window selectively displays information relating to the data stored in the electronic camera in two different forms. In other words, the browser window can be switched between two different display formats or screens. In the first screen, a series of reduced (thumbnail) images (images having a decreased number of pixels compared to the actual image stored by the electronic camera) of the images corresponding to the image data saved in the electronic camera is displayed. This is referred to as the Thumbnail Image Browser Screen. In the second screen, a list of file names and/or icons corresponding to the images is displayed. This is referred to as the Icon Browser Screen. Reduced images are not displayed in the Icon Browser Screen.

As mentioned earlier, the electronic camera or other recording device can store images (e.g., photographed images) and overlay images (e.g., a line drawing or text) and sound associated with the image. Each type of data typically is stored as a separate file that includes a header. Within the header is an index that inter-relates files that are associated with each other. For example, an image, an overlay image and sound data that belong together will have the same index. As used herein, a "recording unit" is comprised of the various data files (image, overlay, sound, etc.) that have the same index. The electronic camera can store a plurality of recording units, each having at least one of image data, overlay data and sound.

Figure 3:
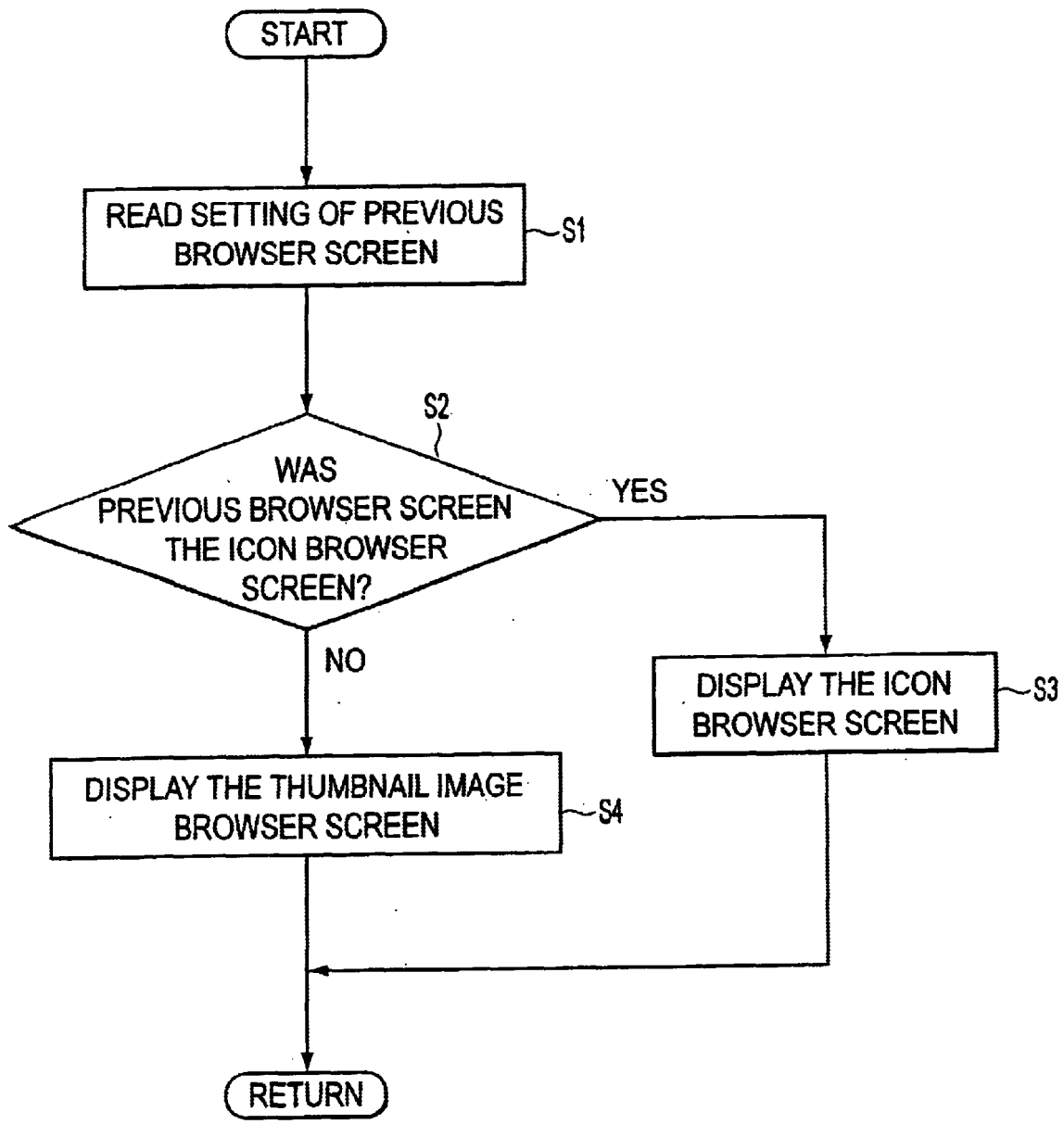
FIG. 3 is a flow chart demonstrating the procedures performed with a browser window.

Next, by referring to the flow chart of FIG. 3, the action of displaying the browser window is explained. The program shown in the flow chart of FIG. 3 is recorded in the hard disk 27 of the display apparatus 1. This program can be provided to the user recorded in the hard disk 27 (e.g., by the retailer of the hard disk in advance of purchase by the user) or the program can be recorded on a separate storage medium such as for example, a CD-ROM (Compact Disc-ROM), or the like, which can be copied to the hard disk 27 (e.g., by the user after purchase of the display apparatus and the CD-ROM).

In step S1, CPU 21 reads the setting of the previous display of the browser window from the hard disk 27. The previous setting is, for example, the setting that was being used when the cancel button 33 of the tool window was last operated to exit the program. In the present example, the setting is either the Thumbnail Image Browser Screen or the Icon Browser Screen.

In step S2, CPU 21 determines whether the Icon Browser Screen was previously displayed. When it is determined that the previous browser screen was the Icon Browser Screen, flow proceeds to step S3.

In step S3, CPU 21 searches the image data stored in the electronic camera, as well as any voice data and overlay data (image data corresponding to any images overlapping and displayed on the image—this can be, for example, handwritten or typed text that relates to the image) and the corresponding file names, and displays icons representing such data (or icons representing the absence of such data) in the browser window. The data representing the icon images is recorded in the hard disk 27 in advance. Thus, the data representing the icon images is not read from the electronic camera.

Figure 4:
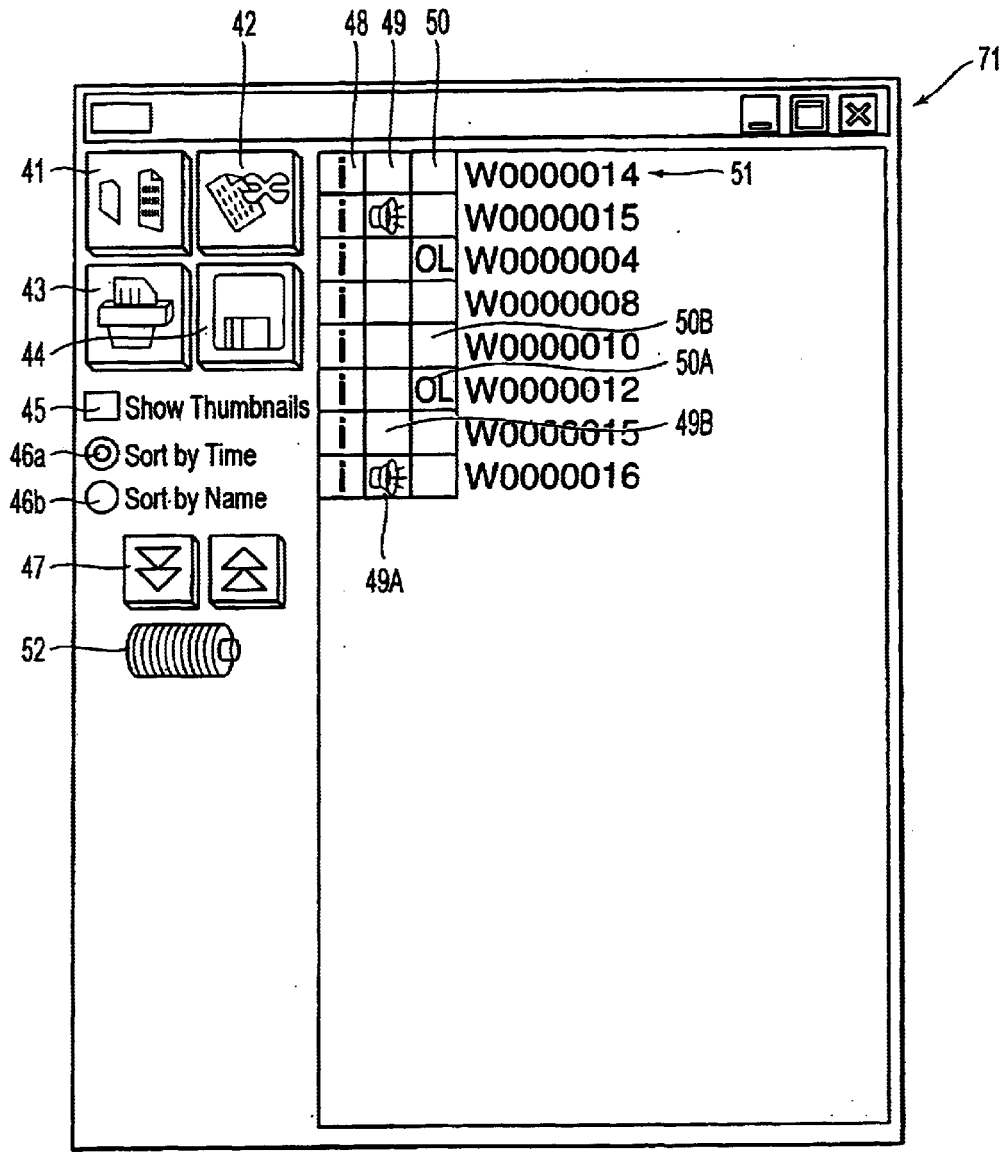
FIG. 4 illustrates one example of a browser window in which a list of file names and icons is displayed.

FIG. 4 shows an example of the Icon Browser Screen, which displays a list of icons and/or file names. (A file name can be an icon or simply text that is not an icon.) Referring to this browser screen, the shutter button 41 is operated when it is desired to operate the shutter of the connected electronic camera. The read button 42 is operated when it is desired to read data from the electronic camera (to be described in more detail below). The erase button 43 is operated when it is desired to erase specified data stored in the electronic camera. The save button 44 is operated when it is desired to save specified data stored in the electronic camera, for example, to the hard disk 27, or the like.

The thumbnail check box 45 is operated when switching from the Icon Browser Screen to the Thumbnail Image Browser Screen or vice versa.

When it is desired to display the data files arranged in time order, the Sort by Time button 46a is selected after an order control button 47 is operated. The Sort by Name button 46b is selected after the order control button 47 is operated when it is desired to display the data files arranged in name order.

In a battery capacity display 52, an image of the battery is displayed. The length of the image corresponds to the remaining capacity of the batteries of the electronic camera.

Referring to FIG. 4, when in the Icon Browser Screen, a list of recording unit entries are displayed. Each recording unit entry includes data (of one or more types, as mentioned earlier and as described below) that relates to a particular image stored in the electronic camera (or other connected data storing device). In the illustrated embodiment, each recording unit entry consists of a plurality of icons that represent the data contained in the actual, stored recording unit.

Information icons 48 are displayed for each recording unit (which can include image data, sound data, and the like) stored in the electronic camera. Sound icons 49 displayed to the right of the information icons 48 show the existence of sound data for the particular recording unit. Specifically, icon 49A is displayed only when sound data exists, and (empty) icon 49B is displayed if no sound data exists. The overlay icons 50 displayed to the right of the sound icons 49 show the existence of overlay data for the particular recording unit. In particular, icon 50A is displayed only when overlay data exists, and (empty) icon 50B is displayed if no overlay data exists.

The file names 51 displayed on the right side of the above-mentioned icons show the file name in which the image data is saved. Moreover, when it is desired to select one of the recording units, the user selects the display of the file name 51 corresponding to the desired recording unit (for example, by clicking the mouse when the cursor is located over the desired file name 51 (if the file name 51 can function like an icon) or by clicking over icon 48). Additionally, for example, the background color of the selected file name 51 can change to indicate that the file name 51 is selected.

For example, when only image data and sound data is recorded, the information button 48 and sound button 49A are shown corresponding to that recording unit. After selecting the predetermined file name 51, sound button 49, and overlay button 50, CPU 21 reads only the selected data from the electronic camera through interface 28. Then, the image and/or sound corresponding to the data is output to the display 11 and to the speaker 14 when the read button 42 is operated.

For example, after the predetermined data (in other words, file name 51) is chosen, CPU 21 reads the image data corresponding to the file name 51 from the electronic camera through the interface 28 and the image corresponding to the data is displayed in another window of the display 11 by pushing the read button 42.

As stated above, a list of icons and/or file names corresponding to the data stored in the electronic camera is displayed. The icons and/or file names are representations of the data stores in one or more of the recording units, and can be displayed in less space than the thumbnail images. By displaying such a list of representations, it is possible to display information regarding a large amount of recording units stored in the electronic camera in one screen. It is also possible to decrease the amount of the data that needs to be read from the electronic camera to generate the Icon Browser Screen, which saves time.

Returning to the FIG. 3 flow chart, if the browser screen of the previously displayed browser window is determined to be the Thumbnail Image Browser Screen in step S2, the program proceeds to step S4. In step S4, CPU 21 searches the image data, stored in the electronic camera, as well as the voice data, overlay data, and the corresponding file names, and displays a representation of the stored data in the browser window as icons 48, 49, and 50 and/or file names 51. Additionally, CPU 21 reads the image data from the electronic camera through the interface 28 and reduces the image to a predetermined number of pixels to produce reduced images (thumbnail images). These thumbnail images are displayed in display 11.

Figure 5:
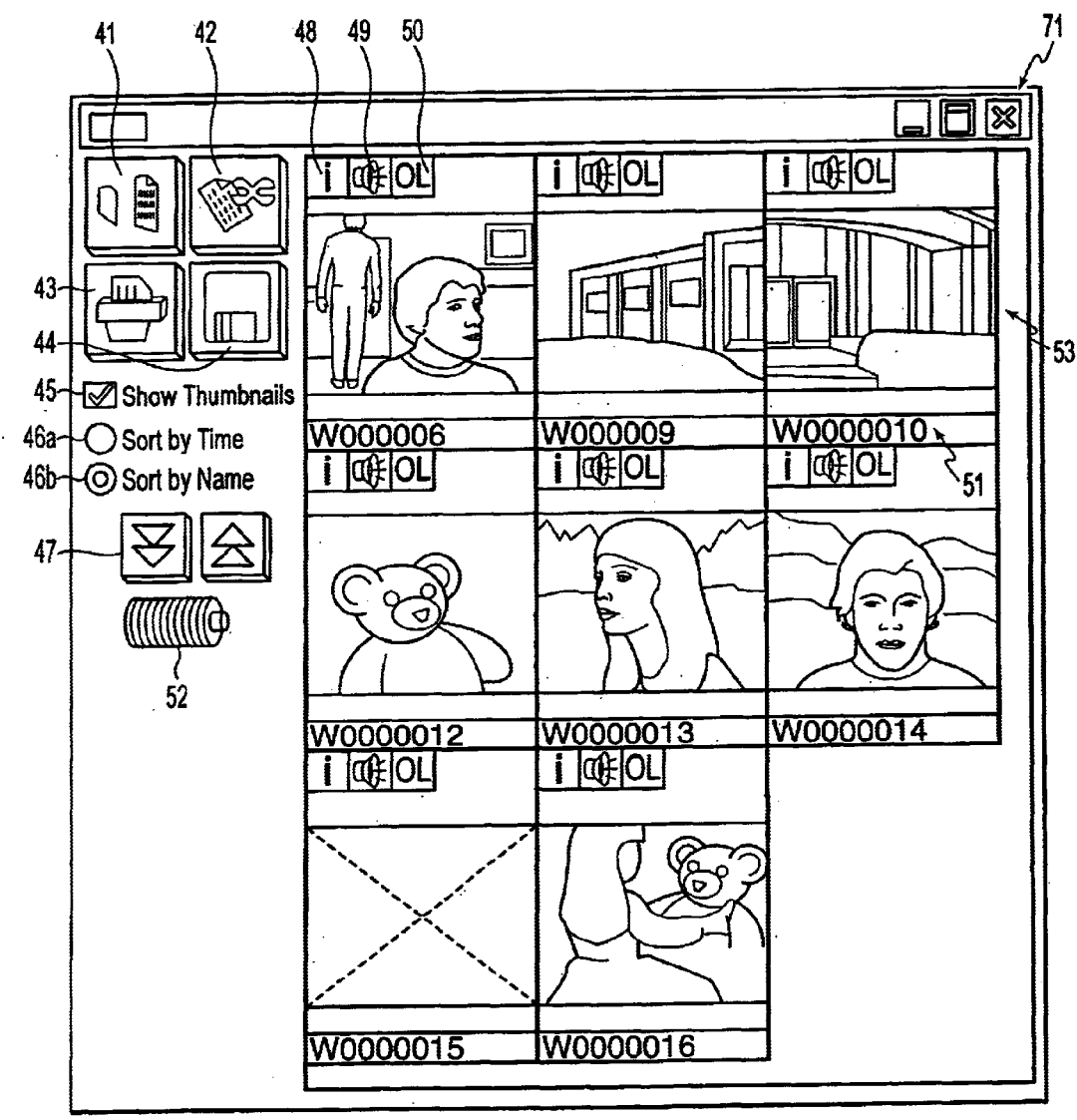
FIG. 5 illustrates one example of a browser window in which a series of thumbnail images are displayed.

FIG. 5 shows an example of the Thumbnail Image Browser screen, which displays a series of thumbnail images. In this browser screen, the thumbnail images 53 are displayed in correspondence with the information icons 48, sound icons 49, overlay icons 50 and file names 51 in a series of thumbnail areas. That is, each thumbnail area includes a thumbnail image 53, icons 48–50 and a file name 51.

When the thumbnail images are displayed in this manner, the content of the images can be confirmed. In order for the thumbnail image to be useful to confirm the content of the image, it is larger than icons. Accordingly, the amount of data (e.g., the number of files) displayed in one screen is less than the amount of data (e.g., the number of files) displayed in the Icon Browser Screen of FIG. 4.

As stated above, the series of thumbnail images 53 or the list of file names 51 and icons corresponding to the data saved in the electronic camera are displayed in accordance with the previous setting of the browser window. However, it is also possible for the browser window to always start in a predetermined (default) screen.

Figure 6:
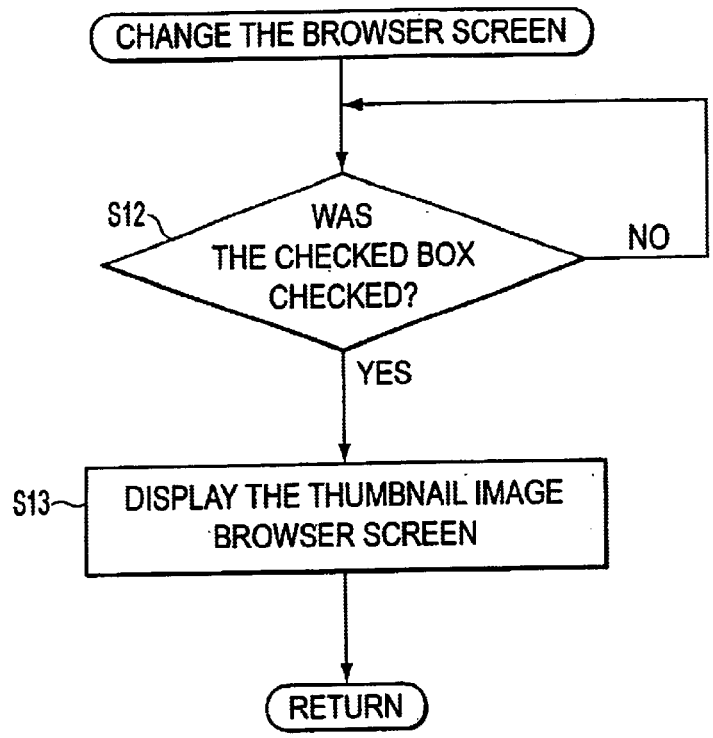
FIG. 6 is a flow chart demonstrating the procedures performed when changing from a list of file names and icons to a series of thumbnail images.

Next, with reference to the flow chart of FIG. 6, the operations performed when changing from the Icon Browser Screen to the Thumbnail Image Browser Screen are explained. The program indicated in the flow chart of FIG. 6 is recorded in the hard disk 27 of the display apparatus 1 (either when supplied to the consumer or thereafter if supplied on CD-ROM).

First, the mouse 13 is operated, the file name 51 corresponding to the displayed thumbnail image is selected in advance, and this information is saved in RAM 23, for example. In step S12, CPU 21 waits until the thumbnail check box 45 of the browser window is checked. If box 45 is not checked, the Icon Browser Screen remains selected. After the thumbnail check box 45 is checked in step S12, the program proceeds to step S13. In step S13, the CPU 21 reads the image data corresponding to the selected file name 51 from the electronic camera through the interface 28. Then, as stated above, after the thumbnail check box 45 is checked, the thumbnail image is displayed in the browser window. When the thumbnail check box 45 is checked again (which removes the check-mark from box 45), the thumbnail image is erased and the original file name 51 and the list of icons are displayed.

In this example, the thumbnail image of single data file corresponding to a selected file name 51 was displayed. However, regardless of the existence of the selection, it is acceptable to display thumbnail images corresponding to all the image data in the electronic camera, to the extent that there is space on the display screen for all such thumbnail images.

Figure 7:
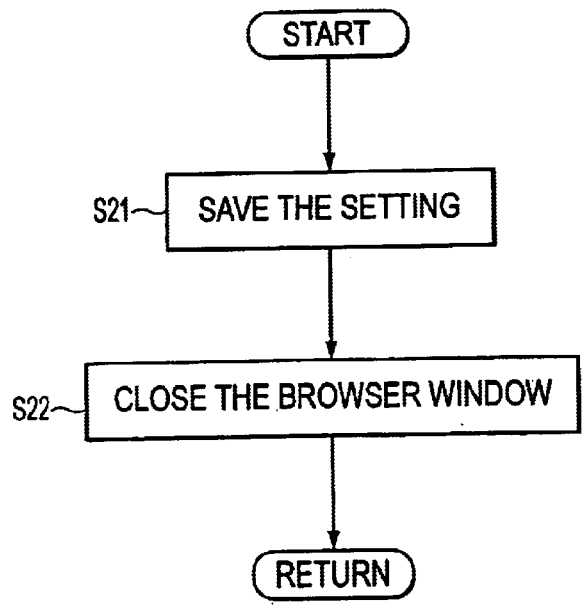
FIG. 7 is a flow chart demonstrating the procedures performed when closing the browser window.

Next, saving the setting of the browser window is explained with reference to the flow chart of FIG. 7. The program indicated in the flow chart of FIG. 7 is recorded in the hard disk 27 of the display apparatus 1 (either initially or thereafter via CD-ROM).

Figure 2:
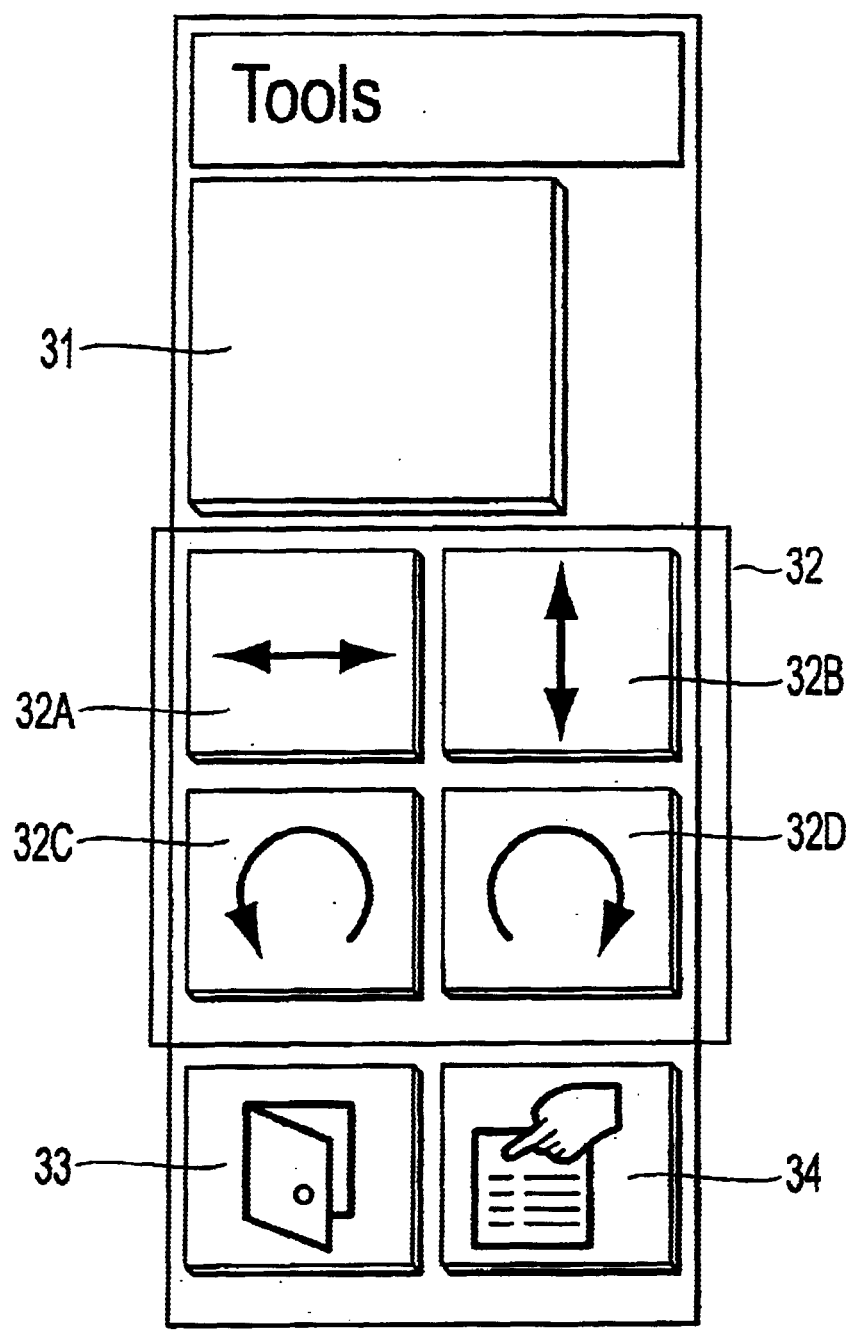
FIG. 2 illustrates one example of a tool window.

By selecting a close button 71 of the browser window shown in FIGS. 4 and 5, the browser window is closed, and by pressing the cancel button 33 of the tool window of FIG. 2, the program is completed. In both cases, in step S21, CPU 21 determines the setting of the browser window, in other words, either the list of file names or the series of thumbnail images that was displayed, and saves this setting in a predetermined file in the hard disk 27. In step S22, the browser window is closed.

As stated above, the setting of the browser window at the time of being closed is saved so the window can be displayed in the same setting as the setting of the previous browser window. By this procedure, the browser window is temporarily erased and other windows may be displayed. When the browser window is displayed again, operability is good because the browser window can be displayed in the same setting.

As stated above, according to this embodiment of the present invention, the format of the display switches between a series of reduced images corresponding to the images saved in the electronic camera, and a list of file names (and/or icons) of the images saved in the electronic camera.

In this embodiment of the present invention, the file names 51 can be selected (i.e., by clicking the mouse when the cursor is over the file name) when selecting the image data. However, it is also acceptable to arrange the icons that show the image data along side of the file name 51 and to select the predetermined image by using the icon (i.e., by clicking on the icon 48 instead of the file name 51).

In the above embodiment of the present invention, the personal computer was connected to an electronic camera. However, as mentioned previously, the personal computer can be connected to other recording apparatus such as, e.g., a scanner or the like.

In the above embodiment, a hard disk 27 is used as a recording medium. However, it is also acceptable to provide a different type of recording medium, such as, e.g., a magnetooptical disk or the like.

As stated above, according to embodiments of the invention, the content of images can be confirmed more readily by switching between a display of icons relating to the images, which permits information relating to more recorded images to be displayed, and a display of reduced images of the images stored in the recording apparatus.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. A display apparatus comprising:
    means for coupling the display apparatus to a recording device that stores a plurality of image files; and
    image generation means for generating a display of information about the plurality of image files, the image generation means being selectively switchable between a first display mode and a second display mode, when in the first display mode the image generation means generating a display of thumbnail images corresponding to a plurality of the image files stored in the recording device, and when in the second display mode the image generation means generating a display of at least one of file names and icons corresponding to the plurality of image files stored in the recording device, wherein the first and second display modes are not selected or displayed simultaneously.

2. The apparatus of claim 1, wherein at least one of file names and icons corresponding to the plurality of image files is simultaneously displayed within the generated thumbnail images when in the first display mode.

3. The apparatus of claim 1, wherein when in the second display mode, the image generation means also generates icons that indicate sound information associated with the plurality of image files.

4. The apparatus of claim 1, wherein the image generation means operates in the second display mode as an initial screen.

5. The apparatus of claim 1, wherein the image generation means is initialized in the display mode in which the image generation means was previously used.

6. The apparatus of claim 1, wherein each of the thumbnail images generated in the first display mode corresponds to image information of a different image file, and the image generation means generates a list of at least one of file names and icons when in the second display mode, each file name and icon corresponding to a different one of the image files.

7. The apparatus of claim 6, wherein the second display mode displays the file names.

8. The apparatus of claim 7, wherein the second display mode also displays at least one icon representing each file.

9. The apparatus of claim 6, wherein the second display mode displays at least one icon representing each image file.

10. The apparatus of claim 1, wherein the second display mode displays the file names.

11. The apparatus of claim 10, wherein the second display mode also displays at least one icon representing each image file.

12. The apparatus of claim 1, wherein the second display mode displays an icon representing each image file.

13. A display apparatus comprising:
    an interface that is couplable to a recording device that stores a plurality of image files; and
    a controller that is selectively operable in first and second display modes to generate first and second display screens, respectively, the first display screen including a display of thumbnail images corresponding to a plurality of the image files stored in the recording device, the second display screen including a display of at least one of file names and icons corresponding to the plurality of image files stored in the recording device, wherein the first and second display modes are not selected simultaneously and the first and second display screens are not displayed simultaneously.

14. The apparatus of claim 13, wherein the controller generates a thumbnail image for each of the image files stored in the recording device in the first display screen, and generates a list of at least one of the file names and icons, one for each of the image files stored in the recording device, in the second display screen.

15. The apparatus of claim 14, wherein the second display screen displays a print-out of the file name for each of the image files.

16. The apparatus of claim 15, wherein the second display screen also displays at least one icon representing each image file.

17. The apparatus of claim 14, wherein the second display screen displays at least one icon representing each image file.

18. The apparatus of claim 13, wherein the controller also displays icons in the first display screen and in the second display screen, the icons representing data associated with the image files.

19. A method of using a display apparatus to display information about files stored in a recording device coupled to the display apparatus, comprising the steps of:
    generating a first display that includes thumbnail images corresponding to the plurality of image files stored in the recording device when the display apparatus is in a first display mode; and
    generating a second display when the display apparatus is in a second display mode, the second display including at least one of file names and icons corresponding to the plurality of image files stored in the recording device, wherein the first and second display modes are not selected simultaneously and the first and second displays are not displayed simultaneously.

20. The method of claim 19, wherein the generated first display includes a plurality of the thumbnail images, each corresponding to a different image file stored in the recording device, and the generated second display includes a list of at least one of file names and icons, each corresponding to a different one of the image files stored in the recording device.

21. The method of claim 20, wherein the second display includes a print-out of the corresponding file name.

22. The method of claim 20, wherein the second display includes at least one icon representing each image file.

23. The method of claim 19, wherein the recording device is an electronic camera.

24. A recording medium that stores a control program for use by a display apparatus that is couplable to a recording device that stores a plurality of image files, the control program including instructions for:

generating a first display that includes thumbnail images corresponding to a plurality of the image files stored in the recording device; and generating a second display that includes at least one of file names and icons corresponding to the plurality of image files stored in the recording device, wherein the first and second displays are not displayed simultaneously.

25. The recording medium of claim 24, wherein the control program also includes instructions for displaying at least one of file names and icons corresponding to the image file in the first display.

26. The recording medium of claim 24, wherein the control program also includes instructions for displaying icons that indicate sound information associated with the image file.

27. The recording medium of claim 24, wherein the control program includes instructions for displaying the second display as an initial screen.

28. The recording medium of claim 24, wherein the control program includes instructions for displaying as an initial screen the last display among the first display and second display.

29. A display apparatus comprising:

means for coupling the display apparatus to a recording device that stores a plurality of image files; and image generation means for generating a display of information about the plurality of image files, the image generation means being selectively switchable between a first display mode and a second display mode, when in the first display mode the image generation means generating a display of thumbnail images corresponding to a plurality of the image files stored in the recording device, and when in the second display mode the image generation means generating a display of at least one of file names and icons corresponding to the plurality of image files stored in the recording device, wherein the first and second display modes are not selected or displayed simultaneously; and wherein when in at least one of the first display mode and the second display mode, the image generation means also generates an icon in connection with at least one image file among the plurality of image files, the icon indicating the existence of information associated with the at least one image file which has been recorded separately from the at least one image file.

\* \* \* \* \*